Feb. 20, 1923.

H. O. HEM

SCALE PIVOT

Filed Feb. 18, 1920

Inventor
Halvor O. Hem.

By George R. Frye

Attorney

Patented Feb. 20, 1923.

1,445,882

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

SCALE PIVOT.

Application filed February 18, 1920. Serial No. 359,605.

*To all whom it may concern:*

Be it known that I, HALVOR O. HEM, a citizen of the United States, residing at Toledo, in the county of Lucas and State of Ohio, have invented certain new and useful Improvements in Scale Pivots, of which the following is a specification.

This invention relates to weighing scales and other instruments having knife edge pivots, and has particular reference to devices for protecting the pivots and bearings from dust and corrosion.

When scales are used in chemical manufacturing establishments where the air contains the fumes of acids and other corrosive agents, or where such substances are likely to come into direct contact with the pivots and bearings, in creameries where salt and water vapor are present, in mills and collieries where the mechanism must work in floating dust or grit, or where the scale is not sufficiently protected from the weather, or is installed in proximity to salt water, the operation of the pivots and bearings is apt to be injuriously affected by the action of chemicals, fumes or dirt. The principal object of this invention is the provision of a device to so hold grease or other semi-solid protective substance that it substantially covers the operative parts of the pivot and bearing and thereby excludes not only dirt but moisture, fumes, and such matter as is likely to have a deleterious effect on the life and continued accuracy of the scale.

Other objects and advantages will be apparent from the following description, in which reference is had to the accompanying drawings illustrating a preferred embodiment of my invention and in which similar reference numerals designate similar parts throughout the several views.

In the drawings:—

Figure 1:
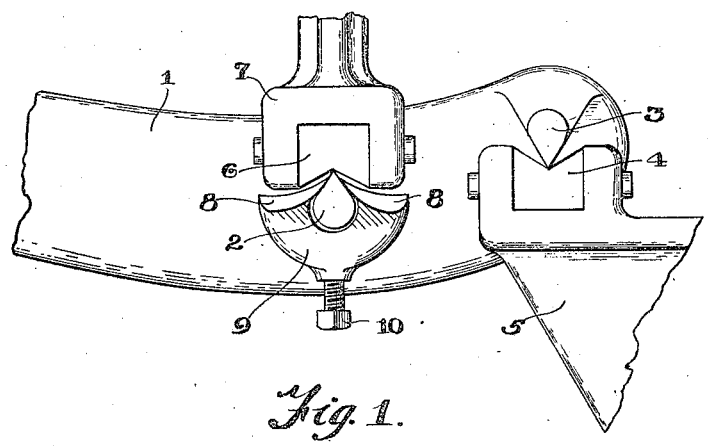
Figure 1 is a side elevation of a portion of a lever showing the device of my invention attached to the load pivot.

Referring to the drawings in detail, the lever 1 is provided with knife edge load and fulcrum pivots 2 and 3 which may be of any desired type and which, in the example shown, are secured in place when the lever is cast. The pivot 3 rests upon a self-aligning bearing 4 pivoted upon a fulcrum bracket 5, while the load pivot 2 supports a self-aligning bearing 6 pivoted to a platform supporting member 7. The structure above described is not per se a feature of my invention and is shown only for the purpose of clearly illustrating a preferred embodiment thereof.

Figure 2:
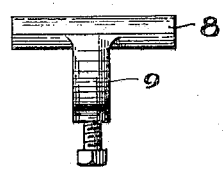
Figure 2 is an elevation with the device removed from the pivot.
Figure 3:
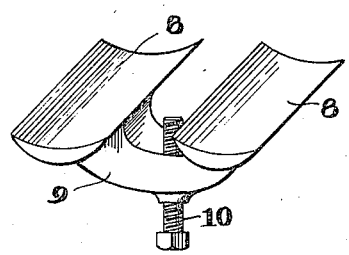
Figure 3 is an enlarged perspective view thereof.

Since the groove of the bearing 6 opens downwardly any packing of grease or other substance with which it is filled soon falls out and leaves the knife edge of the pivot 2 unprotected. I have therefore provided an attachment which consists essentially of a pair of shallow troughs 8 connected by a yoke 9. The adjacent edges of the troughs 8 are substantially parallel and so close together that the thickened or back portion of the pivot 2 cannot pass between them, so that when the device is slipped into the position in which it is shown in Figure 2, with the adjacent edges of the troughs engaging the converging sides of the pivot and the yoke portion 9 passing beneath the pivot, it can only be removed by sliding it outwardly. For the purpose of retaining the device and pivot in rigid relation a set screw 10 is threaded through the yoke 9 to engage the back of the pivot 2. When the set screw is turned up the troughs 8 are firmly clamped against the sides of the pivot 2.

It is apparent that while the device in no way interferes with the operation of the scale when the space above the troughs is filled with grease, foreign matter is effectively excluded from the co-acting portions of the pivot and bearing.

The fulcrum pivot 3 has not been shown with the grease-holding device applied thereto for the reason that since the groove of the bearing 4 opens upwardly the bearing itself will hold packing fairly effectually without a special retainer. The retainer may, however, obviously be inverted and applied to this pivot also. I have shown the grease retainer as an attachment adapted to be applied to a pivot of known construction, but it may be incorporated in the lever or the pivot structure, and its form, of course, will vary according to the type of pivot with which it is to be employed.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a device of the class described, the combination with a knife edge pivot and bearing, of means secured to said pivot for retaining a semi-solid protective substance about said pivot.

2. In a device of the class described, the combination with a knife edge pivot and bearing, of means secured to said pivot for retaining a semi-solid protective substance between the sides of said pivot and said bearing.

3. In a device of the class described, the combination with a pivot, of means for retaining a semi-solid protective substance about said pivot, said means comprising supporting members adjacent each side of said pivot and fixedly connected thereto.

4. In a device of the class described, the combination with a pivot, of means for retaining a semi-solid protective substance about said pivot, said means comprising supporting members detachably secured upon each side of said pivot.

5. In a device of the class described, the combination with a pivot, of means for retaining a semi-solid protective substance about said pivot, said means comprising trough-like supporting members detachably secured upon each side of said pivot.

6. A device for retaining a semi-solid protective substance upon a pivot comprising a pair of supporting members, and means for securing said supporting members adjacent the pivot.

7. A device for retaining a semi-solid protective substance upon a pivot comprising a pair of supporting members, and a yoke connecting said members.

8. A device for retaining a semi-solid protective substance upon a pivot comprising a pair of trough-like supporting members, and a yoke connecting said members.

9. A device for retaining a semi-solid protective substance upon a pivot comprising a pair of trough-like supporting members, a yoke connecting said members, and a set screw threaded through said yoke.

10. A grease retainer comprising, in combination, a pair of trough-like supporting members adapted to engage the converging sides of a pivot, a yoke rigidly connecting said members and adapted to pass around the back of said pivot, and a set screw threaded through said yoke and adapted to engage said pivot.

HALVOR O. HEM.

Witnesses:
C. E. WILCOX,
C. O. MARSHALL.